Aug. 16, 1927.
C. I. SCHROCK
1,639,312
TOOL FOR PLACING WASHERS IN RUBBER HEELS
Filed Oct. 9, 1923    3 Sheets-Sheet 1
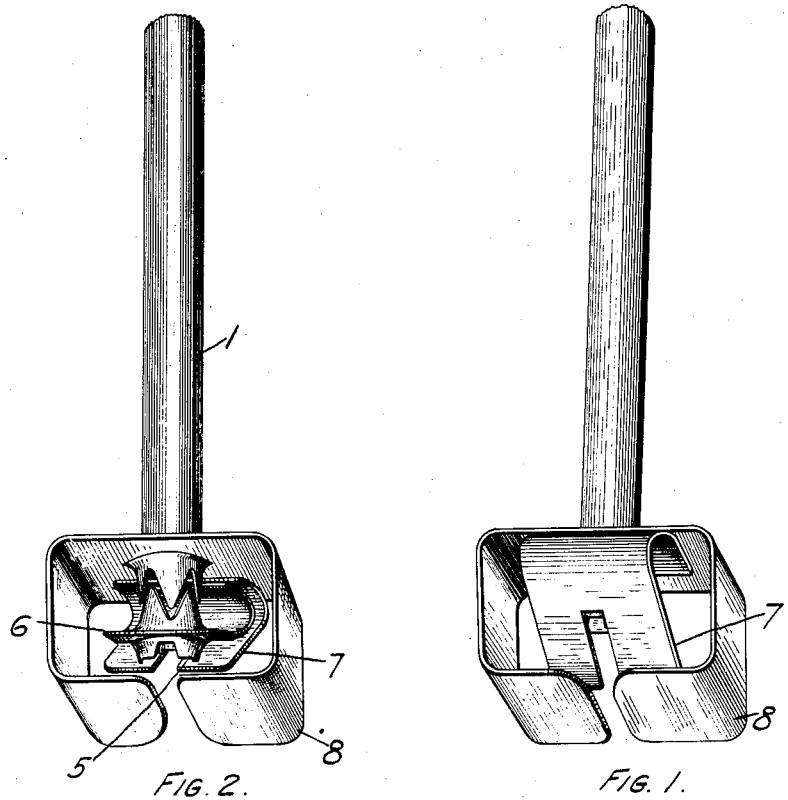
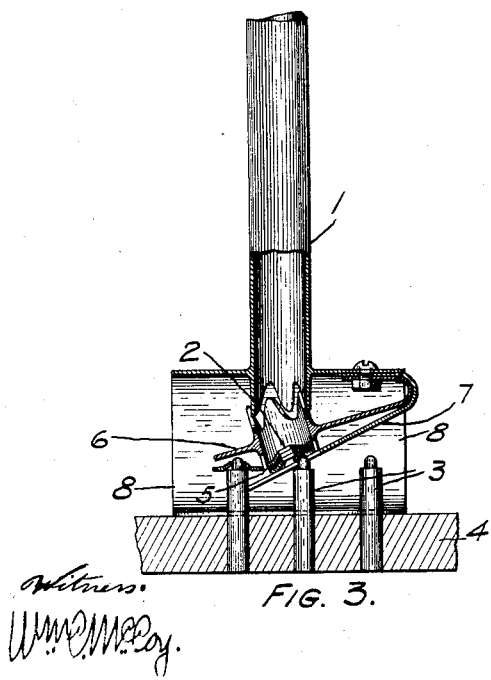
INVENTOR
CHARLES I. SCHROCK.
BY
ATTORNEY

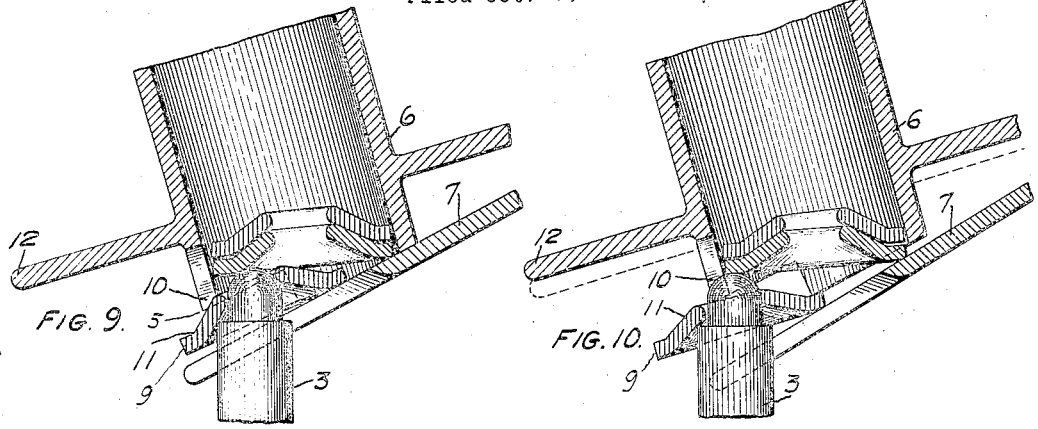
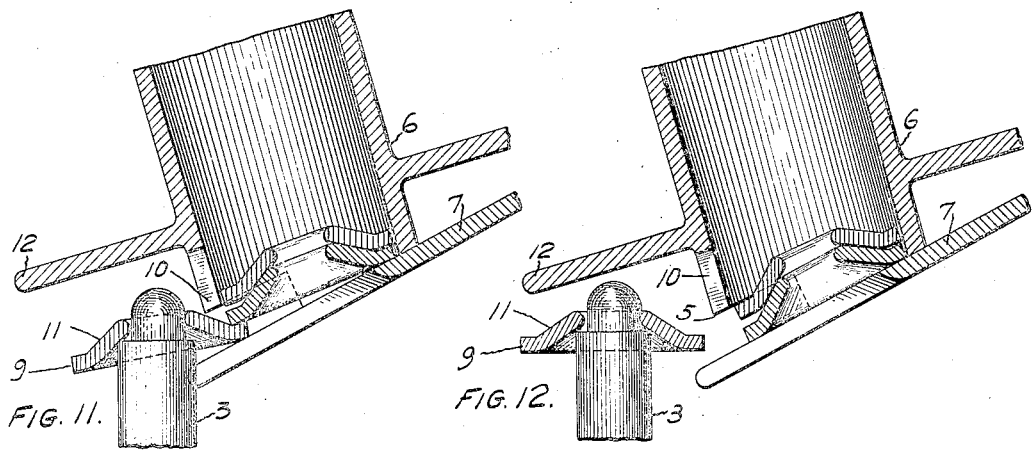
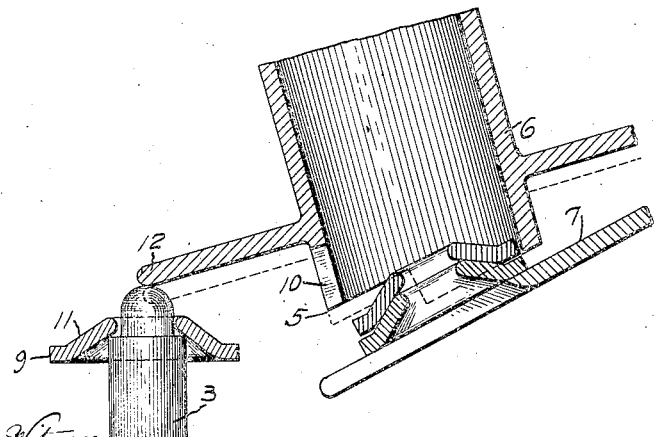

Patented Aug. 16, 1927.

1,639,312

UNITED STATES PATENT OFFICE.

CHARLES I. SCHROCK, OF PASADENA, CALIFORNIA, ASSIGNOR TO THE GOODYEAR TIRE & RUBBER COMPANY, OF AKRON, OHIO, A CORPORATION OF OHIO.

TOOL FOR PLACING WASHERS IN RUBBER HEELS.

Application filed October 9, 1923. Serial No. 667,565.

This invention relates to a tool for placing washers on the pins of molds for rubber heels and it particularly contemplates a hand tool that may be passed over a line of pins in a heel mold to place automatically a washer on each pin of the mold.

It has previously been customary to place manually the washers on each pin of a mold for rubber heels. Various mechanical devices have been proposed for accomplishing this function, but their operation has not been dependable, or their associated mechanism has been so complicated that the continued refilling of the device, the removal of washers dropped onto the face of the mold from the machine, or the attention to pins left without washers, required more attention and time than the manual operation of mounting the washers on the pins.

My device embodies a magazine that receives a stack of concentrically arranged superposed washers that constitute a sufficient charge to supply the pins of several complete molds without recharging. The device has been found to operate substantially without error if properly manipulated and to save much time for the operator in supplying washers to the pins of heel molds.

Fig. 1 of the accompanying drawings is a front view, shown in perspective, of a tool constructed in accordance with my invention;

Fig. 2 is a rear view of the tool shown in Fig. 1;

Fig. 3 is a sectional view taken in the plane of movement of the device and illustrating the method of operation; and Figs. 4 to 13 inclusive diagramatically illustrate the successive positions of a washer and the associated stack during operation.

Figure 4:
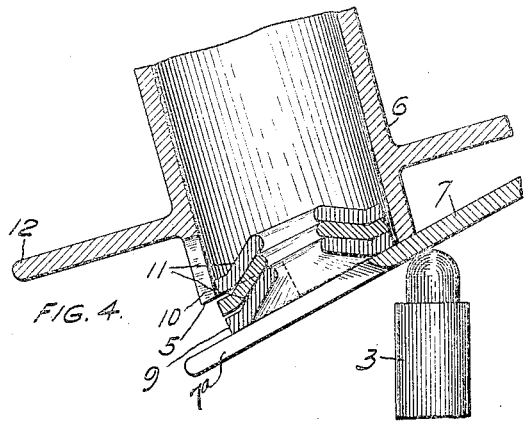

The device comprises a magazine 1 that is adapted to receive a charge of conical washers 2 stacked in concentric relation and adapted to be distributed over the pins 3 of a heel mold 4, only a portion of which is shown, through an aperture 5 that is formed between a lower portion or sleeve 6 of the magazine 1 and a resiliently mounted escapement device 7 that also constitutes a part of the support for the stack of washers. The lower portion 6 of the magazine is also resiliently mounted. A pair of guides 8 serve to align the device with the respective mold pins and also to space definitely the exit of the magazine from the face of the mold.

The detailed construction and operation of my device may best be explained by referring to Fig. 3 wherein the device is illustrated as being moved from left to right over a series of mold pins 3; and to Figs. 4 to 13, inclusive, that illustrate in enlarged sectional view, the various positions of each washer during its removal from the stack.

The two members 1 and 6 may be regarded as a primary magazine and a secondary magazine. It will be noted that the lower portion 6, while forming with the tube 1 a continuous channel for the washers, is not integral with the tube. Serrations in the adjoining edges of the tubes 1 and 6 maintain the washers in their proper path and permit limited movement of the part 6 relative to the tube 1.

The tubes 1 and 6 could be made integral, but the structure shown is preferred, for reasons that will appear from a consideration of the operation of the device.

Figure 6:
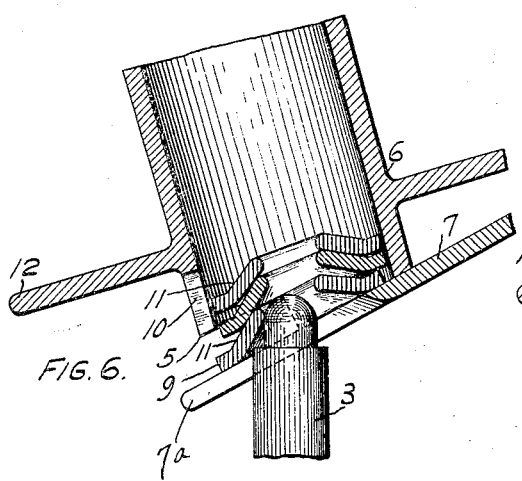
Figure 7:
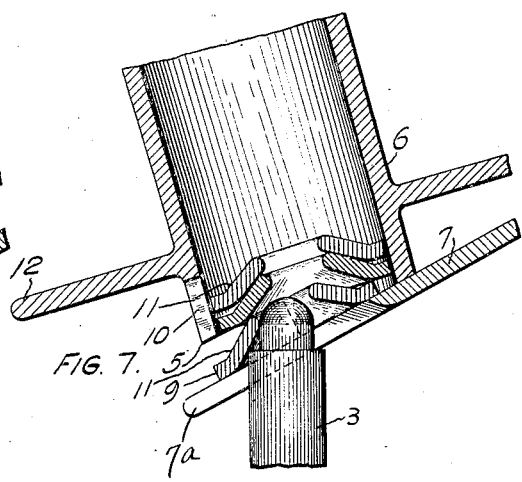
Figure 8:
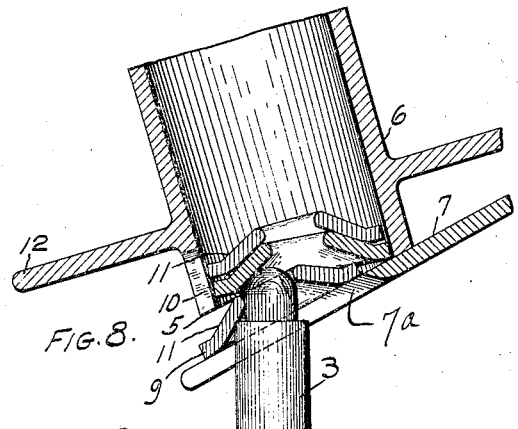

The guide members 8 align the tool with the line of mold pins. As the tool approaches each of the pins 3, there is generally sufficient clearance between the top of the pin and the escapement device or treadle portion 7 to permit the tool to advance until the opening through the lowermost washer 9 of the stack 2 with which the tool is charged is directly over the top of the mold pin as shown in Fig. 6. It will be noted that the escapement device is provided with a slot or aperture, 7ª, through which the mold pin 3 must pass before contacting with a washer, and which functions in part as a local guide for the proximate mold pin. In this respect, the part 7ª is somewhat different from the part 8, which operates primarily to align the tool with an entire row of pins.

Continued movement of the tool causes the top of the mold pin to engage the trailing edge of the opening in the center of the washer and drag the washer through the aperture 5 which is of slightly less height than the individual washers. The aperture 5 is sufficiently large to permit the free passage of the leading edges of the washer being removed, but the oppositely disposed overhanging shoulders 10 engage the conical shoulders 11 of the individual washer on each side of the mold pin as the washer is drawn through the aperture. This is particularly true if the mold pin is of such height that it moves the washer in substantially a horizontal direction after it partially emerges from the aperture as illustrated in Fig. 9 and Fig. 10.

The resilient relation of parts 6 and 7 also serves to prevent unintentional loss of washers on the face of the mold by providing a slight impediment to the exit of the washer. Normally the nested relation of the washers maintains them in place without other restrictions, but sudden jars disturb this relation and, as a protection against such contingencies, an aperture formed between yielding parts is advised.

The shoulders 10 also resiliently bear down upon the sloping sides of the washer 11 as it is moved through the aperture to straighten the washer upon the mold pin. This action forces the washer down onto the end of the pin and thereby prevents its escape from the magazine except when impaled and held by a pin.

The overhanging guard 12 is carried by the resiliently mounted portion 6 of the magazine and it acts to prevent the escape of the washers from the pins. This guard also acts as a means for jogging the washers to cause them to settle to the bottom of the magazine. As the guard 12 finally leaves the pin, the magazines 1 and 6 contact with a quick movement that shakes the bottom portion of the stack. This is not entirely essential, but is beneficial.

At times it may be desirable to construct the spring mountings for the lower portion 6 of the magazine and of the escapement device 7 of such relative strength that the escapement device 7 will move away from the magazine portion 6 during the discharge of the washer, or so that the magazine portion 6 will lift to such position that the washer is discharged almost horizontally. It may also be found expedient to form the aperture 5 of sufficient size to permit the complete removal of each of the washers without changing the relation of the magazine portion 6 and the escapement device 7. These are questions of design however, that depend upon the particular application of the machine.

Figure 5:
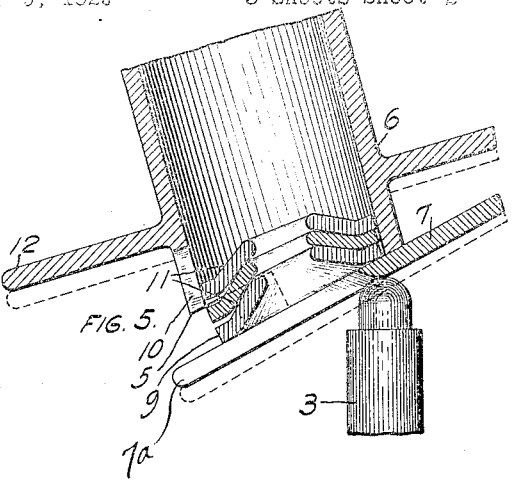

If, the mold pin is of greater height than the advancing edge of the lowermost washer of the stack, then the escapement device 7 rides on top of the pin and lifts the bottom portion 6 of the magazine to the level at the top of the mold pin as shown in Fig. 4 and Fig. 5. The washer is then positively dropped upon the top of the pin by the release of the escapement device 7 as shown in Fig. 6. This permits the pin to enter directly beneath the edge of the lowermost washer through the aperture 7a after the parts 6 and 7 are no longer supported from the mold pin. Continued movement of the tool relative to the pin directs the top of the mold pin into the hole of the washer and, since the upper end of the mold pin is somewhat smaller than the opening in the washer, the washer will descend upon the mold pin and usually permit the lower portion 6 of the magazine and the escapement device 7 to return to their respective normal positions before the washer is drawn through the aperture 5.

As the washer is drawn through the aperture 5 the lower portion 6 of the magazine engages the opposite shoulders of the washer to press the washer down upon the shoulder of the mold pin. It should be noted that the trailing edge of the magazine portion 6 is normally maintained by its spring mounting at approximately the average level of the top of the mold pins. This relation prevents the escape of washers from the mold pins before they are securely seated thereon, and the resilient mounting of the magazine portion 6 permits this relation to be maintained for pins of different lengths.

It should also be pointed out that, although the stack of washers is approximately vertical, the escapement device 7 that supports the lowermost washers of the stack is inclined at a considerable angle in the direction of movement of the tool in order to permit the advancing edge of the washer to be moved over the mold pin, before it is empaled thereby.

Although I have described only one adaptation of my invention, it will be apparent that various modifications of the tool could be employed without departing from the spirit and scope of my invention.

What I claim is:

1. A device for applying washers to the pins of a mold for rubber heels comprising, a tubular magazine adapted to receive a charge of conical washers coaxially stacked with the apexes of the respective washers extending in the same direction, a guide adapted to direct a mold pin into the hole in the lowermost washer of the stack, said guide also constituting a support for the stack of washers having its supporting surface inclined to the direction of movement of the device, and means adapted to maintain said magazine a determined distance from the face of the mold.

2. A device for applying washers to the pins of a mold for rubber heels comprising a tubular magazine adapted to receive a charge of conical washers coaxially stacked with the apexes of the respective washers extending in the same direction, a guide adapted to adjust itself to the height of the individual mold pins and to direct a mold pin into the hole in the lowermost washer of the stack, said guide also constituting a support for the stack of washers having its supporting surface inclined to the direction of movement of the device, and means adapted to maintain a definite separation between said magazine and the face of the mold.

3. A device for applying washers to the pins of a mold for rubber heels comprising a tubular magazine adapted to receive a charge of coaxially stacked washers, an escapement device adapted to receive a supply of washers from said magazine and to deposit one of said washers upon each mold pin over which the device is moved, and means for maintaining definite spaced relation of the magazine and the face of the mold.

4. A device for applying washers to the pins of a mold for rubber heels comprising a tubular magazine adapted to receive a charge of coaxially stacked washers, a resiliently controlled escapement device actuated by the mold pins to adjustment in accordance with the height of the respective mold pins, and means adapted to maintain a definite separation of the magazine and the face of the mold.

5. A device for distributing washers to a mold having a plurality of pins projecting from the surface thereof, comprising, a cylindrical tubular magazine adapted to receive a charge of coaxially stacked washers, an exit for a single washer at the lower end of the magazine, and means constituting a part of the magazine adapted to direct a mold pin to empale the lowermost washer of the stack and withdraw it laterally from the stack.

6. A device for mounting conical washers on the pins of a mold for rubber heels comprising, a cylindrical magazine adapted to receive a charge of conical washers coaxially stacked with their respective apices extending in the same direction, and a seat on the bottom of said magazine adapted to support the lowermost washers at an inclined angle with respect to the direction of movement of the magazine, said seat having a slot therethrough adapted to direct a mold pin diametrically across the lowermost washer of the stack, an aperture being formed between the seat and the magazine of sufficient size and shape to permit the removal laterally from the stack of only one washer at a time.

7. A device for mounting washers on the pins of a mold for rubber heels comprising a magazine adapted to receive a coaxially arranged stack of washers, and an escapement mechanism constituting a part of the magazine and actuated by contact with the mold pins to permit only one washer to become empaled on a single mold pin.

8. A device for mounting washers on the pins of a mold for rubber heels comprising a magazine adapted to receive a coaxially arranged stack of washers, an escapement device adapted to permit only one washer to become empaled on a single mold pin, and means for jarring the stack of washers immediately before the lowermost washer of the stack is removed.

9. A device for mounting washers on the pins of a mold for rubber heels comprising a magazine adapted to receive a coaxially arranged stack of washers, a resiliently mounted treadle part adapted to be lifted when the machine is passed over a mold pin and to drop to its normal position when a washer is empaled on the mold pin, and a resiliently mounted sleeve intermediate the treadle portion and the magazine adapted to be actuated by the mold pin after the treadle part is released from the mold pin.

10. A device for mounting washers on the pins of a mold for rubber heels comprising a magazine adapted to receive a coaxially arranged stack of washers, a resiliently mounted treadle part adapted to be actuated by engagement with a mold pin, and a sleeve interposed between the treadle part and the magazine and adapted to be actuated thereby.

11. A device for mounting washers on the pins of a mold for rubber heels comprising a magazine adapted to receive a stack of coaxially disposed washers, a resiliently mounted treadle part adapted to be actuated by engagement with a mold pin, and a sleeve interposed between the treadle part and the magazine and adapted to be actuated thereby, said sleeve also being adapted to be independently actuated by the mold pin.

12. A device adapted to distribute cupped washers to a series of pins comprising a magazine adapted to receive a stack of coaxially arranged nested washers and a supporting face at the lowermost end of the magazine adapted to angularly present the cupped face of the lowermost washer of the stack to the pin, an aperture being formed in the magazine of sufficient size to permit the removal of the lowermost washer substantially laterally from the stack.

13. A device adapted to distribute washers to a series of pins comprising a magazine adapted to receive a stack of coaxially arranged superposed washers, a supporting member adapted to angularly present the face of the lowermost washer to the respective pins as the device is moved from pin to pin, an aperture being formed between the magazine and the member adapted to open by actuation by the pin as the device is moved from pin to pin, and means for causing an up and down movement of the stack relative to the magazine as the washers are withdrawn.

14. A device adapted to distribute washers to a series of pins comprising a magazine adapted to receive a stack of coaxially arranged nested washers, and a supporting face at the exit end of the magazine, a yieldable aperture being formed between the supporting face and the magazine and means adapted to be actuated by the respective pins for enlarging said aperture sufficiently to release said washers one at a time.

15. A device adapted to distribute washers to a series of pins comprising a magazine adapted to receive a stack of coaxially arranged nested conical washers, and a supporting face at the exit end of the magazine adapted to incline the face of the lowermost washer toward the mold pin, an aperture being formed between the magazine and the supporting face and adapted to freely pass the edges of the washer but to engage and resiliently depress the conical shoulders of each washer as it is moved through the aperture.

16. The method of distributing washers to a series of pins which consists in coaxially stacking a quantity of washers in superposed relation, supporting the lowermost washers of the stack at an angle to the axis of the respective pins, and relatively moving the stack and the pin to cause the lowermost washer to engage a mold pin and be dragged laterally from the stack.

17. The method of distributing conical washers to a series of pins which consists in coaxially stacking the washers in nested relation, supporting the lowermost washer of the stack angularly relative to the axis of the pin in order that the pin may engage the cupped side of the washer, relatively moving the stack of washers and the mold pin to cause the mold pin to draw the washer laterally from the stack, and simultaneously supporting the remaining washers to prevent their removal from the stack.

18. In a device for arranging heel washers, a primary magazine adapted to retain superposed regularly disposed washers and a secondary magazine having means for retaining a stack of washers arranged in coaxial relation with each other, said secondary magazine being in engagement with and movable with respect to the primary magazine.

19. In a device for arranging heel washers, a guide member, a tubular primary magazine adapted to retain concentrically superposed washers mounted in fixed relation to the guide member and a secondary magazine engaging the primary magazine and movable with respect thereto.

20. A device for arranging heel washers, a cylindrical tubular primary magazine and a cylindrical tubular secondary magazine relatively movable with respect to each other adapted to retain coaxially disposed washers, each magazine being provided with means complemental to means formed on the other to provide a substantially continuous passage for washers through the magazines.

21. In a device adapted to distribute washers to heel mold pins, a guide member, a magazine secured to the guide member and provided at one extremity with serrations, and a second magazine resiliently supported by the guide member and provided with serrations adapted to loosely engage the serrations on the first named magazine.

22. In a device for supplying washers to the pins of heel molds, a guide, washer magazines mounted in the guide, and an escapement device associated with the guide, automatically operative upon contact of the escapement device and the pins, to alter the effective length of the magazines.

23. A device for applying washers to the pins of a mold for rubber heels comprising a tubular magazine adapted to retain a charge of regularly disposed nested washers, a member arranged to support the stack provided with a guide adapted to direct the mold pin into engagement with the aperture of the lowermost washer, the member being mounted for displacement a sufficient distance to permit the lateral withdrawal of the lowermost washer as the device is moved over the mold pin.

24. A device for applying washers to the pins of a mold for rubber heels comprising a magazine adapted to retain a charge of regularly disposed washers, and an escapement device yieldably secured to the lower end of the magazine and angularly disposed thereto, and arranged to permit the release of the lowermost washer as the device is moved over the mold.

25. A device for supplying washers to the pins of heel molds comprising a tubular magazine adapted to retain a charge of stacked washers, and a yieldably mounted support for the stack at the discharge end of the magazine movable upon contact of a mold pin therewith to permit the removal of the lowermost washer and to place the same upon the mold pin.

26. A device for applying washers to the pins of a heel mold comprising a magazine adapted to receive a charge of washers disposed in regular relation and to conduct them adjacent a mold pin, a movable member mounted at the discharge end of the magazine to retain the washers therein until the lowermost washer is engaged by a mold pin, and resilient means holding the movable member in position to prevent the escape of more than one washer on each mold pin.

27. A device for applying washers to pins of heel molds comprising a pair of tubular magazines each provided with portions projecting in complemental recesses formed in the other magazine, each magazine being adapted to retain a plurality of washers disposed therein in regular superposed relation, the magazines being movably mounted with respect to each other and adapted to be actuated by contact with a mold pin to permit the release of a washer from one of the magazines.

28. A device for supplying washers to the pins of heel molds, including a magazine adapted to retain a charge of washers in regularly disposed relation, an escapement device to permit the release of a washer on a pin comprising a member swingably mounted about a locus positioned a substantial distance from the exterior of the magazine, and resilient means for maintaining the member in operative relation to the magazine.

In witness whereof, I have hereunto signed my name.

CHARLES I. SCHROCK.